United States Patent
Ema et al.

(10) Patent No.: US 7,569,614 B2
(45) Date of Patent: Aug. 4, 2009

(54) PROCESS FOR PRODUCING ACIDIC AQUEOUS ALUMINA SOL

(75) Inventors: Kiyomi Ema, Toyama (JP); Takaichi Sugiyama, Chiyoda-ku (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 565 days.

(21) Appl. No.: 10/546,912

(22) PCT Filed: Mar. 11, 2004

(86) PCT No.: PCT/JP2004/003173

§ 371 (c)(1),
(2), (4) Date: Aug. 25, 2005

(87) PCT Pub. No.: WO2004/080898

PCT Pub. Date: Sep. 23, 2004

(65) Prior Publication Data

US 2006/0128817 A1    Jun. 15, 2006

(30) Foreign Application Priority Data

Mar. 14, 2003    (JP) ............................ 2003-069243

(51) Int. Cl.
*C09K 3/00* (2006.01)
*B01F 3/00* (2006.01)

(52) U.S. Cl. .......................... 516/94; 516/93; 516/922; 516/928

(58) Field of Classification Search ............... 516/94, 516/93, 922, 928; 210/650; 100/35
See application file for complete search history.

(56) References Cited

U.S. PATENT DOCUMENTS

| 4,492,682 A | 1/1985 | Trebillon |
| 4,666,614 A | 5/1987 | Block |
| 5,989,515 A | 11/1999 | Watanabe et al. |

FOREIGN PATENT DOCUMENTS

| CA | 2002254 | 5/1990 |
| EP | 0 147 167 | 7/1985 |
| JP | A 57-111237 | 7/1982 |
| JP | A 58-176123 | 10/1983 |
| JP | A 60-215521 | 10/1985 |
| JP | A 2-243512 | 9/1990 |
| JP | A 10-87324 | 4/1998 |

*Primary Examiner*—Timothy J. Kugel
(74) *Attorney, Agent, or Firm*—Oliff & Berridge, PLC

(57) ABSTRACT

A process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, by use of an aqueous alkali aluminate solution and liquid or gaseous carbon dioxide as starting materials. The obtained acidic aqueous alumina sol has a low viscosity and is stable for salts. The dried gel obtained from the sol is characterized in that the gel structure thereof is rigid even though it is porous.

11 Claims, No Drawings

PROCESS FOR PRODUCING ACIDIC AQUEOUS ALUMINA SOL

TECHNICAL FIELD

The present invention relates to a process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope.

BACKGROUND ART

Various colloidal particles of alumina hydrates have already been produced by various processes for production. The colloidal particles are a generic term for particles having a particle size of 1 to 1000 nm, that is, those having a particle size of colloidal level. Most of these produced colloidal particles are composed of alumina hydrates having a boehmite structure or pseudoboehmite structure, or amorphous alumina hydrates, and it is known that they are plate-like, ribbon-like, spindle-like, needle-like or fibrous in shape.

JP 57-111237 A (1982) discloses a process for producing an alumina sol comprising hydrothermally treating an alumina hydrate obtained by reacting a water-soluble aluminum salt with carbon dioxide or a carbonate to obtain a processed product, and then drying it, or drying the processed product, and then mixing it with a monobasic acid.

JP 02-243512 A (1990) discloses a process for isolating a fine and plate-like α-aluminum monohydrate (alumina hydrate having a boehmite structure) product by controlling molar ratio of a caustic aluminate liquor at a temperature below 100° C. and cooling the alkaline solution with vigorous stirring.

U.S. Pat. No. 4,666,614 discloses a process for producing α-aluminum monohydrate comprising reacting an acid or alkali reaction solution controlled to pH of 7.5 to 10 at 60 to 100° C. for 2 to 7 hours and drying it to 35 mass % or more.

JP 57-111237 A (1982) states that as to production condition of alumina hydrate, in case where an aluminate of alkali metal is used as a water-soluble aluminum salt, it is sufficient to follow a usual production process in which gaseous carbon dioxide is bubbled into the salt and the carbon dioxide is desirably introduced until the reaction system reaches pH near 7, and then the produced alumina hydrate is washed for removing impurities. Further, the publication states that smaller amount of remaining impurities is preferable from viewpoint of the production or use of alumina sol.

JP 02-243512 A (1990) states that the α-aluminum monohydrate of the invention is plate-like crystal having a size (average particle size is 0.4 μm, or in particle size distribution, 90% or more of particles are in a range from 0.2 to 0.8 μm) suitable for pigment filler, and that boehmite separating maximum rate from sodium aluminate solution is obtained at a molar ratio $Na_2O/Al_2O_3$ of 1.3.

U.S. Pat. No. 4,666,614 states that an aluminum compound is reacted with an acid or an alkali, pH is adjusted to 7.5 to 10, and then heating is carried out at 60 to 100° C., thereafter by-products formed by neutralization are removed to obtain a sol having an alumina hydrate concentration of 10 to 35 mass %.

In the production processes disclosed in JP 57-111237 A (1982) and JP 02-243512 A (1990), the need of washing step carried out after the neutralization with an alkali and an acid is stated. However, the washing is carried out with pure water, not only it is time-consuming until completion but also the intermediates allowed to stand after washing and filtration tend to cause aluminum hydroxide. The aluminum hydroxide is produced due to aging of the aimed product (amorphous alumina gel). And, alumina hydrate having a boehmite structure originally aimed is not obtained at a normal temperature. In order to prevent the aging, carbonate or gaseous carbon dioxide, etc. is generally added. However, as carbon dioxide is weak acid, a large amount of it is required for neutralization, therefore it is economically disadvantageous to adjust to pH around neutrality.

In addition, in case where the alumina obtained by the process disclosed in JP 02-243512 A (1990) is used as a filler for filling pigment, it cannot show its sufficient performance for any application purpose as the size of the particles is large. Therefore, those having further small particle size are required.

In the production processes disclosed in JP 57-111237A (1982) and U.S. Pat. No. 4,666,614, a large amount of acid or alkali used at pH range in neutralization step is required and thereby leading to high production cost, and further there are some problems that a large amount of pure water or chemicals and time are required for washing by-products, and efficiency is not good.

Further, the required physical properties such as viscosity and thixotropic property of the aqueous alumina sol are different according to each application purpose. It is desired to provide a further improved aqueous alumina sol for specific application purposes.

DISCLOSURE OF INVENTION

It is an object of the present invention to provide a process for producing inexpensively, easily and efficiently an aqueous alumina sol with a small particle size having a viscosity and thixotropic property which are not attained by a conventional aqueous alumina sol. Concretely, the present invention provides an acidic aqueous alumina sol having a low viscosity and stable for salts. And, a dried sol obtained from the sol is characterized in that the gel structure thereof is rigid even though it is porous.

A first aspect of the present invention is a process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (A), (B) and (C) of:

(A) adding liquid or gaseous carbon dioxide to an aqueous alkali aluminate solution at a solution temperature of 5 to 35° C. to produce a reaction mixture having a pH of 10.5 to 11.2;

(B) subjecting the reaction mixture obtained in the step (A) to a hydrothermal treatment at a temperature of 110 to 250° C. to produce an aqueous suspension containing an alumina hydrate having a boehmite structure; and (C) desalting the aqueous suspension obtained in the step (B) by adding water and an acid by ultrafiltration to form an acidic aqueous alumina sol having a pH of 3 to 7.

A second aspect of the present invention is the process for producing a stable acidic aqueous alumina sol as described in the first aspect, wherein in the step (B), the reaction mixture obtained in the step (A) is subjected to a pretreatment by stirring for 2 to 24 hours prior to the hydrothermal treatment.

A third aspect of the present invention is a process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (a), (b) and (c) of:

(a) adding liquid or gaseous carbon dioxide to an aqueous alkali aluminate solution at a solution temperature of 5 to 35° C. to produce a reaction mixture having a pH of 10.5 to 11.2;

(b) subjecting the reaction mixture obtained in the step (a) to a hydrothermal treatment at a temperature of 110 to 250° C. to produce an aqueous suspension containing an alumina hydrate having a boehmite structure; and (c) desalting the aqueous suspension obtained in the step (b) by adding water and an acid by cake filtration to form an acidic aqueous alumina sol having a pH of 3 to 7.

A fourth aspect of the present invention is the process for producing a stable acidic aqueous alumina sol as described in the third aspect, wherein in the step (b), the reaction mixture obtained in the step (a) is subjected to a pretreatment by stirring for 2 to 24 hours prior to the hydrothermal treatment.

A fifth aspect of the present invention is a process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (A'), (B') and (C') of:

(A') adding liquid or gaseous carbon dioxide to an aqueous alkali aluminate solution at a solution temperature of 5 to 35° C. to produce a reaction mixture having a pH of 10.5 to 11.2;

(B') subjecting the reaction mixture obtained in the step (A') to a hydrothermal treatment at a temperature of 110 to 250° C. to produce an aqueous suspension containing an alumina hydrate having a boehmite structure; and (C') contacting the aqueous suspension obtained in the step (B') with hydrogen-type positive cation-exchange resin and hydroxide-type strongly basic anion-exchange resin to form an acidic aqueous alumina sol having a pH of 3 to 7.

A sixth aspect of the present invention is the process for producing a stable acidic aqueous alumina sol as described in the fifth aspect, wherein in the step (B'), the reaction mixture obtained in the step (A') is subjected to a pretreatment by stirring for 2 to 24 hours prior to the hydrothermal treatment.

A seventh aspect of the present invention is a process for producing a high-concentration and stable acidic aqueous alumina sol, the process comprising mechanically dispersing the stable acidic aqueous alumina sol obtained by the process of the first, third or fifth aspect and concentrating the sol.

An eighth aspect of the present invention is a process for producing an aqueous suspension containing an alumina hydrate having a boehmite structure, the process comprising the steps (A) and (B) of:

(A) adding liquid or gaseous carbon dioxide to an aqueous alkali aluminate solution at a solution temperature of 5 to 35° C. to produce a reaction mixture having a pH of 10.5 to 11.2; and (B) subjecting the reaction mixture obtained in the step (A) to a hydrothermal treatment at a temperature of 110 to 250° C. to produce an aqueous suspension containing an alumina hydrate having a boehmite structure.

Compared with a conventional aqueous alumina sol, the stable acidic aqueous alumina sol, and the high-concentration and stable acidic aqueous alumina sol obtained by the present invention act like an intermediate between, for example, a commercially available aqueous alumina sol containing hexagonal plate-like and/or rectangular plate-like particles having high dispersibility of an alumina hydrate having a boehmite structure and a commercially available aqueous alumina sol containing fibrous particles having a high thixotropic property of an alumina hydrate having a boehmite structure, and bring about improvements in various applications which have not been attained by the prior art. Components which are added to a conventional alumina sol to produce a composition may be added to the alumina sol of the present invention. The components include a silica sol, hydrolysate of alkyl silicate, other metal oxide sols, water-soluble resin, resin emulsion, thickener, anti-foaming agent, surfactant, refractory powders, metal powders, pigment, coupling agent and the like.

When the alumina sol of the present invention is blended with various coating components which have been used conventionally, an inorganic coating, heat-resistant coating, corrosion resistant coating, inorganic-organic composite coating or the like can be easily prepared. A dry coating film formed from a coating containing the alumina sol of the present invention is almost free from pin holes and cracks. The reason for this is considered to be that the 50 to 400 nm columnar secondary particles contained in the alumina sol do not cause a segregation phenomenon in the coating film which is seen in ordinary colloidal particles and a rigid crosslinked structure is formed by the secondary particles in the coating film.

BEST MODE FOR CARRYING OUT THE INVENTION

The step (A) in the first aspect, the step (a) in the third aspect, the step (A') in the fifth aspect and the step (A) in the eighth aspect are steps of adding liquid or gaseous carbon dioxide to an aqueous alkali aluminate solution at a solution temperature of 5 to 35° C. to produce a reaction mixture having a pH of 10.5 to 11.2.

The alkali species in the alkali aluminate or the concentrated solution thereof used as a starting material include Na, K, Mg, Zn, Fe, Ca, Ba, Be or the like. The alkali aluminate or the concentrated solution thereof is easily obtained by a known process for production and can be acquired as a commercially available industrial chemical. In particular, inexpensive sodium aluminate or the concentrated solution thereof is preferable. Usually, commercially available sodium aluminate includes high-concentration powder products and concentrated solution having $Al_2O_3$ concentration of 10 to 25 mass %. The concentrated solution is easy in handling and preferable from the viewpoint of homogeneous reaction on addition of carbon dioxide in the next step.

In the present invention, $Al_2O_3$ concentration in the aqueous alkali aluminate solution on addition of carbon dioxide is not specifically limited. From the viewpoint of homogeneous reaction on addition of carbon dioxide and production efficiency, $Al_2O_3$ concentration is preferably 1 to 10 mass %, and more preferably 2 to 6 mass %. Aqueous alkali aluminate solution diluted with pure water or the like is used.

As the diluted aqueous alkali aluminate solution is liable to be hydrolyzed, it is required to be used in the process of the present invention immediately after dilution. In particular, when an aqueous solution obtained by diluting alkali aluminate kept at a high temperature of 50° C. or more before the addition of carbon dioxide is used, it is difficult to obtain the intended primary particles.

The diluted aqueous alkali aluminate solution is stirred by a mechanical method known to those skilled in the art for homogenization. When pure water or the like is charged for dilution of the alkali aluminate or the concentrated solution thereof, partial stirring is carried out. No mechanical stirring may lead to inhomogeneity in a diluted solution of aqueous alkali aluminate solution, and to inhomogeneous reaction with carbon dioxide. Therefore, it is not preferable.

And, the alkali aluminate or the concentrated solution thereof being a starting material includes alkali aluminate obtained by dissolving a basic aluminum salt and/or an aluminum normal salt containing 5 to 200 parts by weight of $Al_2O_3$ based on 100 parts by weight of $Al_2O_3$ contained in the alkali aluminate. The object of the present invention is also attained with this mixed solution. The basic aluminum salt and/or aluminum normal salt used is easily obtained by a known process for production and acquired as a commercially available industrial chemical. Examples of the basic aluminum salt include water-soluble basic aluminum salts such as basic aluminum chloride, basic aluminum nitrate, basic aluminum acetate, basic aluminum lactate and the like. In addition, examples of the aluminum normal salt used include aluminum chloride, aluminum nitrate, aluminum acetate and the like.

By using an aqueous alumina sol containing an increased weight ratio of a basic aluminum salt and/or aluminum normal salt dissolved, the particle size of the primary particles of an alumina hydrate having a boehmite structure obtained by a hydrothermal treatment can be increased. As far as the object of the present invention is attained, an optional component such as cations maintaining the stability of the alkali aluminate can be contained.

Carbon dioxide is used for the alkali aluminate in the present invention. By considering corrosion of apparatus, working atmosphere such as odor, etc., or cost and the like, preferably gaseous carbon dioxide is used. Liquid or gaseous carbon dioxide should be added to the alkali aluminate aqueous solution after the carbon dioxide is adjusted to such a concentration that a large bulk is not formed on the addition. The concentration and addition rate of the acid to be added are determined depending on the intensity of stirring on the addition.

The reaction of carbon dioxide with alkali aluminate aqueous solution occurs an exothermic heat due to heat of neutralization. The exothermic heat causes the aging of the resulting aluminum reaction product to easily form crystalline aluminum hydroxide. The crystalline aluminum hydroxide formed due to the exothermic heat remains even after hydrothermal treatment in the following step. Therefore, it is not able to obtain only aqueous suspension of alumina hydrate having a boehmite structure that is a main object. In addition, the particles of the alumina hydrate having a boehmite structure according to the present invention are in a form of secondary particles which are formed by face-to-face coagulation of rectangular plate-like primary particles. In case where reaction temperature is high, face-to-face coagulation of primary particles is reduced, thereby the secondary particles being columnar particles become short. And, in the resulting acidic aqueous alumina sol, primary particles are increased. Therefore, the forming of crystalline aluminum hydroxide can be inhibited by maintaining a low temperature on addition of carbon dioxide to aqueous alkali aluminate solution, and thus alumina hydrate (colloidal particles) having a desired particle form and crystalline structure can be obtained. In the present invention, the crystalline aluminum hydroxide means that it has clearly a peak by X-ray diffraction analysis.

The method for lowering the temperature on addition of carbon dioxide includes a method in which aqueous alkali aluminate solution is preliminarily cooled and then an acid is added, a method in which further the temperature of carbon dioxide to be added is preliminarily lowered, a method in which the reaction mixed solution is cooled by use of an external cooling apparatus or the like in the middle of the addition, and the like.

The best method is a method including all of the above-mentioned temperature controlling methods. However, when all of these methods are adopted, the cost for equipment investment is increased. Therefore, one or two methods can be selected from these methods.

The reaction temperature of the aqueous alkali aluminate solution in the present invention is 5 to 35° C., preferably 10 to 25° C. A temperature of 5° C. or less is not preferable because an increase in the amount of carbon dioxide used for the reaction, an increase in the viscosity of the reaction mixture (slurry) and the like happen. On the other hand, a temperature over 35° C. is not preferable because the primary particles of alumina hydrate become larger than a desired size.

The time required for the reaction of aqueous alkali aluminate solution with carbon dioxide is effectively 3 hours or less, preferably 1.5 hour or less for preventing crystallization of the resulting aluminum hydroxide.

The reaction mixture (slurry) has preferably pH of 10.5 to 11.2. In case where the reaction mixture has pH of 10.5 or less, a desired aqueous alumina sol containing alumina hydrate having a boehmite structure cannot be obtained even if the hydrothermal treatment is carried out in the next step. In addition, in case where pH is 10.5 or less by neutralizing with carbonate or carbon dioxide, a large amount of needle-like dawsonite is formed after the following hydrothermal synthesis, production efficiency of alumina hydrate having a boehmite structure is lowered, and therefore it is not preferable. On the other hand, pH of 11.2 or more is not preferable because crystalline aluminum hydroxide such as gibbsite or the like is formed when the next step, hydrothermal treatment is carried out. In the present invention, it is a case where the reaction mixture immediately after reaction has pH of 10.6 to 10.8 that alumina hydrate having a boehmite structure is obtained in the best efficiency by hydrothermal synthesis.

The reaction mixture obtained after the reaction is dried by a reduced pressure method at 50° C., and the analysis of the resulting dried product with X-diffraction reveals that it is amorphous product showing no specific peak. If the peak of aluminum hydroxide is observed in this analysis, the aluminum hydroxide remains even after hydrothermal synthesis reaction that is subsequently carried out.

The reaction mixture after reaction may contain coarse particles depending on the type of stirring on the addition of carbon dioxide and the intensity of stirring. If coarse particles are present, inhomogeneous reaction occurs in the next step, hydrothermal treatment. Thus, more homogeneous and finer particles are required. In the present invention, fine particles mean particles in such a degree that clearly granular particles cannot be visually observed, and are not specifically limited by numerical value. In order to obtain such fine particles, stirring and dispersion are carried out. The type of stirring and dispersion carried out for obtaining more homogeneous and fine particles is not specifically limited. Examples therefor include media mill treatment, colloid mill treatment, high-speed high-shear stirring and high-impact dispersion or the like. Although the time for dispersion differs depending on the capacity of apparatus used therefor, it is sufficient to carrying out dispersion until large masses disappear. The longer the time for stirring and dispersion is, the finer and more homogeneous the solid products in the reaction mixture become. However, it is preferable that the time is from 2 hours to 24 hours from the viewpoint of production efficiency.

Although the temperature on stirring is not specifically limited, it is generally from 5 to 40° C., and may be normal temperature.

The step (B) in the first aspect, the step (b) in the third aspect, the step (B') in the fifth aspect and the step (B) in the eighth aspect according to the present invention is a step of subjecting the reaction mixture obtained in the previous step to a hydrothermal treatment at a temperature of 110 to 250° C. to produce an aqueous suspension containing an alumina hydrate having a boehmite structure.

A hydrothermal treatment to the homogenized reaction mixture provides an aqueous suspension of alumina hydrate (secondary particles) having columnar structure or inclined columnar structure and a boehmite structure which are formed by face-to-face coagulation of rectangular plate-like primary particles having a length of one side of 10 to 40 nm and a thickness of 2.5 to 10 nm when observed through an transmission electron microscope.

The shape of the secondary particles is analogous to long cylindrical and branched structures (rouleax (French)) formed by hemagglutination in blood.

The hydrothermal treatment can be carried out at a temperature of 110 to 250° C. When reaction mixture is subjected to the hydrothermal treatment at a temperature below 110° C., a long time is required for forming the crystalline structure from an amorphous alumina hydrate to rectangular plate-like primary particles of alumina hydrate having a boehmite structure in an aqueous suspension, therefore it is not preferable. On the other hand, the hydrothermal treatment at a temperature over 250° C. requires rapid-cooling equipment, ultra-high pressure vessel for the apparatus, and is not preferable. By considering corrosion of apparatus or apparatus cost for pressure resistant structure, it is preferable to be carried out at a temperature of 120 to 160° C. The selection of a higher temperature in the hydrothermal treatment makes possible to increase the primary particle size and particle thickness of the colloid obtained by the hydrothermal treatment.

As an apparatus for the hydrothermal treatment, a known high-pressure apparatus such as an autoclave equipped with a stirrer or a flow-type tubular reactor is used. Although the time for the hydrothermal treatment varies depending on the temperature, it is 5 to 24 hours, preferably 8 to 20 hours.

The aqueous suspension obtained by the hydrothermal treatment is subjected to ultrafiltration or cake filtration, or a contact treatment with an ion exchange resin, or the like, and thereby removing alkalis or alkali salts.

Further, the step (C) in the first aspect according to the present invention is a step of desalting the aqueous suspension obtained in the step (B) by adding water and an acid by ultrafiltration to form an acidic aqueous alumina sol having a pH of 3 to 7.

A diafiltration process which is a variation of ultrafiltration is used for the ultrafiltration. In the diafiltration process, the alkalis and alkaline salts can be removed by adding water. When separation and purification are carried out by extracting the alkali to the side of a solution passing through an ultrafiltration membrane using ultrafiltration, the alkali always remains in the aqueous alumina sol in a batch process. To cope with this, in the diafiltration process used, the amount of the solution passing through the ultrafiltration membrane is increased by adding water and an acid to the aqueous alumina sol while forming an acidic aqueous alumina sol having a pH of 3 to 7, thereby improving the removal rate of the alkali to proceed with desalting efficiently.

An ultrafiltration membrane having a cut-off molecular weight of 6,000 to 200,000 which can be obtained as a commercially available industrial product may be used as the ultrafiltration membrane. A dynamic membrane (ultrafiltration membrane) having a gel layer of colloidal particles formed on a microfiltration membrane which is used in a cross-flow filtration process may also be used.

This desalting is carried out until electric conductivity becomes 1,000 µS/cm or less, preferably 700 to 100 µS/cm when the concentration of $Al_2O_3$ contained in the acidic aqueous alumina sol is 10 mass %. When the concentration of $Al_2O_3$ contained in the acidic aqueous alumina sol of interest is different, the correlation between the concentration of $Al_2O_3$ and electric conductivity may be calculated as being proportional to the correlation between 10 mass % of $Al_2O_3$ and electric conductivity. The desalting temperature is generally 10 to 60° C. and may be normal temperature.

In this step, nitric acid, hydrochloric acid, sulfuric acid, perchloric acid, acetic acid, formic acid, lactic acid or the like can be used as an acid. In this step, both batch system and continuous system may be used for the diafiltration process. An apparatus for the diafiltration process is preferably of a cross-flow type.

Concentration can be carried out by a diafiltration process and/or ultrafiltration process until the concentration of $Al_2O_3$ of interest becomes maximal at 20 mass %.

The step (c) in the third aspect according to the present invention is a step of desalting the aqueous suspension obtained in the step (b) by adding water and an acid by cake filtration to form an acidic aqueous alumina sol having a pH of 3 to 7.

A cross-flow filtration process is preferably employed in the cake filtration.

In the desalting by the cake filtration, a salt generated by the acid and alkali aluminate used for neutralization is removed with addition of water. To maintain a pH at 9 to 12, an alkali may be added to the desalted reaction mixture as required. When separation and purification are carried out by removing the alkali to the side of a solution passing through a cake filtration membrane using cake filtration, a salt always remains in the reaction mixture in a batch process. Then, in the cross-flow filtration process, water and an alkali are added to the reaction mixture to increase the amount of a solution passing through the cake filtration member while forming a desalted mixture having a pH of 9 to 12, whereby the removal rate of the salt is increased to proceed with desalting efficiently.

The desalting is carried out until electric conductivity becomes 500 µS/cm or less, preferably 300 to 100 µS/cm based on 4 mass % of $Al_2O_3$ contained in the desalted mixture. When the concentration of $Al_2O_3$ of interest contained in the desalted mixture is different, the correlation between the concentration of $Al_2O_3$ and electric conductivity may be calculated as being proportional to the correlation between 4 mass % of $Al_2O_3$ and electric conductivity. The desalting temperature is generally 10 to 60° C. and may be normal temperature.

Illustrative examples of the alkali which may be added as required in the desalting by the cake filtration include alkali metal hydroxides, alkaline earth metal hydroxides, alkali metal aluminates, alkaline earth metal aluminates, ammonium hydroxide, quaternary ammonium hydroxide, guanidine hydroxide, amines and the like. Out of these, alkali metal hydroxides such as sodium hydroxide, potassium hydroxide and cesium hydroxide are preferred and sodium hydroxide is particularly preferred. An alkali forming an insoluble salt in the desalted reaction mixture as a by-product is naturally removed.

In the desalting by the cake filtration, both a batch system and continuous system can be employed for the cross-flow filtration process. A preferred industrial apparatus for the process is a continuous rotary filter press which was developed by the National Organic Synthesis Research Laboratory of Czechoslovakia (for details, refer to K. Michel and V. Gruber, Chemie-Ingenieur-Technik Vol. 43, pp. 380 (1971) and F. M. Tiller, Filtration & Separation Vol. 15, pp. 204 (1978)). A known filter cloth can be used in cake filtration. A microfiltration membrane is preferred as the cloth. A microfiltration membrane having a nominal pore size of 0.05 to 10 μm obtained as a commercially available industrial product can be used as the microfiltration membrane.

In the step (C') in the fifth aspect is a step of contacting the aqueous suspension obtained in the step (B') with hydrogen-type acidic cation-exchange resin and hydroxide-type strongly basic anion-exchange resin to form an acidic aqueous alumina sol having a pH of 3 to 7.

In the contact with ion-exchange resin, the aqueous suspension obtained in the hydrothermal treatment step is contacted with a hydrogen-type acidic cation-exchange resin and a hydroxyl-type strongly basic anion-exchange resin. In this step, the alkali in the alkali aluminate being starting material is removed by the above contact treatment with the hydrogen-type acidic cation-exchange-resin. The content of an acid which is a stabilizer for the acidic aqueous alumina sol is adjusted by the contact treatment with the hydroxyl-type strongly basic anion-exchange resin by which the acid used in the neutralization is removed.

The hydrogen-type acidic cation-exchange resin is prepared by subjecting a commercially available strongly acidic cation-exchange resin and/or weakly acidic cation-exchange resin to an ion-exchange treatment with an acid and rinsing. The hydrogen-type acidic cation-exchange resin is preferably used in an amount of about 3 equivalents and not 1 equivalent of the alkali to be removed in the starting material alkali aluminate. The contact treatment with the resin is carried out as follows:

a solution to be treated is caused to flow through a column filled with the resin either downward or upward; or the resin is added to a solution to be treated, stirred and then filtrated.

The temperature of the contacted solution is generally 10 to 60° C. and may be normal temperature.

The hydroxyl-type strongly basic anion-exchange resin is prepared by subjecting a commercially available strongly basic anion-exchange resin to an ion-exchange treatment with sodium hydroxide aqueous solution and rinsing. The resin is used in such an amount that an excessive acid contained in the acidic aqueous alumina sol from which the alkali has been removed should be removed and that an acidic aqueous alumina sol having a pH of 3 to 7 should be obtained. The contact treatment with the resin is carried out simply by adding the resin to a solution to be treated, stirring and then separating the resin by filtration. The temperature of the contacted solution is generally 10 to 60° C. and may be normal temperature.

The resulting acidic aqueous alumina sol having a pH of 3 to 7 obtained in the step (C) in the first aspect, the step (c) in the third aspect and the step (C') in the fifth aspect as mentioned above can be concentrated by a known method such as vacuum concentration or ultrafiltration until the concentration of $Al_2O_3$ of interest becomes maximal at 20 mass %, whereby a stable acidic aqueous alumina sol is obtained.

In these steps, nitric acid, hydrochloric acid, sulfuric acid, perchloric acid, acetic acid, formic acid or lactic acid, etc. can be used as the acid. When the particle size distribution of the acidic aqueous alumina sol having a pH of 3 to 7 obtained in the desalting step is measured by a dynamic light scattering method, there are a case where particles having a hydrodynamic diameter of 50 to 400 nm are observed and another case where both particles having a hydrodynamic diameter of 50 to 400 nm and particles having a hydrodynamic diameter of 600 to 1,400 nm are observed. The proportion of high structural aggregates of secondary particles which are particles having a hydrodynamic diameter of 600 to 1,400 nm is small in this acidic aqueous alumina sol.

Therefore, it is considered that the high structural aggregates of secondary particles are peptized into secondary particles (colloidal particles) by the addition of an acid and desalting. In addition, the secondary particles are formed in columnar structure or inclined columnar structure of 50 to 300 nm by face-to-face coagulation of their primary particles. As the particles are in a form of secondary particles that specific surface area becomes minimum, colloidal dispersion system (alumina sol) forms more stable system. It is improved in stability against addition of electrolytes (salts, etc.).

The seventh aspect of the present invention relates to a process for producing a high-concentration and stable acidic aqueous alumina sol, characterized in that the process comprises mechanically dispersing the stable acidic aqueous alumina sol obtained by the process of the first, third or fifth aspect and concentrating the sol.

In this process, by mechanically dispersing the resulting stable acidic aqueous alumina sol, the high structural aggregates of secondary particles which are present in the acidic aqueous alumina sol in a trace amount are crushed, bonds of particles having columnar structure formed by face-to-face coagulation of the secondary particles are cut with the result of a reduction in the lengths thereof in an elongation direction (columnar direction), and the dispersibility of the sol is further improved, thereby making it possible to obtain a high-concentration and stable acidic aqueous alumina sol.

The mechanical dispersion refers to a media mill treatment, colloid mill treatment, high-speed high-shear stirring and high-impact dispersion. Apparatuses used for the media mill treatment include a ball mill, attritor, sand mill, bead mill and the like. Apparatuses used for colloid mill treatment include a colloid mill, stone mill, K.D. mill, homogenizer and the like. Apparatuses used for high-speed high-shear stirring include High Speed Disperser, High Speed Impeller, Disolver and the like as product names. Apparatuses used for high-impact dispersion include a high-pressure impact homogenizer using a high-pressure pump and ultrasonic high-pressure impact homogenizer. The temperature of the mechanically dispersed solution is generally 10 to 60° C., and may be normal temperature.

The acidic aqueous alumina sol which has been mechanically dispersed can be concentrated by a known method such as vacuum concentration or ultrafiltration until the concentration of $Al_2O_3$ of interest becomes maximal at 35 mass %. Thereby, a high-concentration and stable acidic aqueous alumina sol can be obtained. When the particle size distribution of this high-concentration and stable acidic aqueous alumina sol is measured by a dynamic light scattering method, there are a case where particles having a hydrodynamic diameter of 50 to 400 nm are observed and another case where both particles having a hydrodynamic diameter of 10 to 40 nm and particles having a hydrodynamic diameter of 50 to 400 nm are observed. Through comparison with the results of observation through a transmission electron microscope, it is judged that the particles having a hydrodynamic diameter of 10 to 40 nm are rectangular plate-like primary particles having a length of one side of 10 to 40 nm and the particles having a hydrodynamic diameter of 50 to 400 nm are columnar secondary particles (colloidal particles) having a length of 50 to 400 nm which are formed by face-to-face coagulation of rectangular plate-like primary particles (colloidal particles) having a length of one side of 10 to 40 nm.

In the desalting step, the aqueous suspension containing an alumina hydrate having a boehmite structure is converted into a stable aqueous alumina sol by adding an acid and/or by removing electrolytes derived from the alkali contained in the suspension. The pH of the sol is adjusted to 3 to 7, preferably 3.5 to 6.5 by adding an acid as a stabilizer to improve the stability of the sol. Therefore, a stable acidic aqueous alumina sol having any $Al_2O_3$ concentration of up to 20 mass % can be obtained. This sol is stable without being gelated even when it is kept airtight at 50° C. for one month.

The high-concentration and stable acidic aqueous alumina sol obtained by the process according to the seventh aspect of the present invention is a high-concentration and stable acidic aqueous alumina sol having any $Al_2O_3$ concentration of up to 35 mass %, which is obtained through a concentration step. This sol is stable without being gelated even when it is kept airtight at 50° C. for one month. The colloidal particles of an alumina hydrate obtained in the present invention has an $H_2O/Al_2O_3$ molar ratio of 1.0 to 1.2 after it is dried at 110° C. according to differential thermal analysis at a temperature of up to 110° C. and is identified as colloidal particles of an alumina hydrate having a boehmite structure according to the result of powder X-ray diffraction.

When the stable acidic aqueous alumina sol and the high-concentration and stable acidic aqueous alumina sol obtained according to the present invention are observed through a transmission electron microscope, the colloidal particles are columnar secondary particles having a length of 50 to 400 nm which are formed by face-to-face coagulation of rectangular plate-like primary particles having a length of one side of 10 to 40 nm and a thickness of 2.5 to 10 nm.

In the meanwhile, analysis methods used in the present invention are as follows.

(1) Analysis of Composition
(i) $Al_2O_3$ concentration: gravimetric analysis (residue after baking at 800° C.)
(ii) $Na_2O$ concentration: atomic absorption spectrometry (the pretreatment is a dissolution treatment with hydrochloric acid)
(iii) Acetic acid concentration: neutralization titration method (2) pH Measurement
The pH meter D-22 (manufactured by Horiba, Ltd.) was used.

(3) Electric Conductivity
The electric conductivity meter ES-12 (manufactured by Horiba, Ltd.) was used.

(4) Particle Size Measured by Dynamic Light Scattering Method
The particle size meter based on dynamic light scattering method: DLS-6000® (manufactured by Otsuka Electronics Co., Ltd.) was used. Cumulants method was used to measure the hydrodynamic diameter of particles contained in the solution.
(Measurement condition) solvent: pure water (25° C.)

(5) Particle Size Distribution Measured by Dynamic Light Scattering Method
The particle size meter based on dynamic light scattering method: DLS-6000® (manufactured by Otsuka Electronics Co., Ltd.) was used. Modified Marquadt method (histogram analysis program) was used to measure a hydrodynamic particle size distribution in the solution. The hydrodynamic diameter of each particle group (mode) is obtained as a measurement result.
(Measurement condition) solvent: pure water (25° C.)

(6) Specific Surface Area (BET Method)
A sample which has been dried under predetermined conditions is measured using the MONOSOKB MS-16 specific surface area meter which makes use of a nitrogen gas adsorption method (manufactured by Quantachrome Corp.).

(7) Observation through a Transmission Electron Microscope
A sample which has been diluted with pure water is applied to a hydrophilic carbon-coated collodion film on a microscope sample grid of copper and dried to prepare a sample to be observed. Electron microscopic photographs of the sample are taken with the transmission electron microscope JEM-1010 (manufactured by JEOL Ltd.) for observation.

(8) Differential Thermal Analysis
The differential thermal analyzer TG/DTA320U (manufactured by Seiko Instruments & Electronics, Ltd.) was used.
(measurement conditions)
sample: 16 mg, reference: 16 mg of α-alumina, measurement temperature range: 25 to 1,100° C., temperature elevation rate: 10° C./min.

(9) Powder X-Ray Diffraction
The X-ray diffraction apparatus XRD-6100 (manufactured by Simadzu Corporation) was used.

EXAMPLES

Example 1

In a stainless steel vessel equipped with a stirrer and a gas blowing tube, 1,258 g of a commercially available sodium aluminate solution (AS-17 manufactured by Hokuriku Kasei Industry Co., Ltd., $Al_2O_3$ concentration of 19.13 mass %, $Na_2O$ concentration of 19.46 mass %) and then 4,758 g of water were added and strongly stirred. The solution temperature of the diluted sodium aluminate aqueous solution was 22° C. Gaseous carbon dioxide obtained by gasification of liquid carbon dioxide was introduced in the aqueous solution at a flow rate of 1.67 L/min. for 95 minutes. The reaction mixture (slurry) had a solution temperature of 30° C. and pH of 10.63 immediately after the introduction of the gaseous carbon dioxide. In succession, the reaction mixture was stirred at room temperature for 4 hours to obtain 6,000 g of the stirred reaction mixture (pH 10.80, $Al_2O_3$ concentration of 4.0 mass %).

Into a stainless steel autoclave vessel, 4,000 g of the resulting reaction mixture was charged, and subjected to hydrothermal treatment 140° C. for 15 hours. The resulting aqueous suspension had pH of 10.30, an electric conductivity of 56.4 mS/cm and $Al_2O_3$ concentration of 4.0 mass %. When the particle size distribution of this aqueous suspension was measured by a dynamic light scattering method, particles having a hydrodynamic diameter of 182 nm (standard deviation of 23 nm) and particles having a hydrodynamic diameter of 920 nm (standard deviation of 115 nm) were observed.

After the aqueous suspension was taken out, 5,000 g of pure water and 14.8 g of acetic acid were added to the total amount of the aqueous suspension and stirred to adjust pH to 6.10. Thereafter, the resulting mixture was desalted with addition of 7,000 g of pure water by an automatic continuous pressure filtration apparatus equipped with a stirrer and an ultrafiltration membrane (cut-off molecular weight of 50,000), and then concentrated in the apparatus to obtain 1,680 g of an acidic aqueous alumina sol. The obtained acidic aqueous alumina sol had pH of 6.80, $Al_2O_3$ concentration of 9.5 mass %, $Na_2O$ concentration of 88 ppm per mass, an electric conductivity of 104 μS/cm, a viscosity of 25 mPa·s, an acetic acid concentration of 0.18 mass %, a particle size measured by a dynamic light scattering method of 265 nm, and a specific surface area measured by the BET method of powders dried at 300° C. of 108 m²/g.

When the particle size distribution of the obtained acidic aqueous alumina sol was measured by a dynamic light scattering method, only particles having a hydrodynamic diameter of 260 nm (standard deviation of 60 nm) were observed. It was observed through a transmission electron microscope that the primary particles of alumina hydrate contained in the obtained acidic aqueous alumina sol were rectangular plate-like particles having a length of one side of 10 to 20 nm and a thickness of 2.5 to 7.5 nm. And they formed secondary particles of columnar structure or inclined columnar structure having a length of one side of 50 to 300 nm which are formed by face-to-face coagulation of the primary particles.

The shape of the secondary particles is analogous to long cylindrical and branched structures (rouleax (French)) formed by hemagglutination in blood.

When powders obtained by drying the acidic aqueous alumina sol at 110° C. were thermally analyzed up to 1,100° C., the colloidal particles of the alumina hydrate had an $H_2O/Al_2O_3$ molar ratio of 1.09 and were identified as an alumina hydrate having a boehmite structure according to the result of powder X-ray diffraction of the above-mentioned powders (Table 1). This acidic aqueous alumina sol was stable without being gelated even after it was kept airtight at 50° C. for one month.

TABLE 1

| d (angstrom) | I/I₀ (relative strength) |
|---|---|
| 6.163 | 100 |
| 3.171 | 60 |
| 2.350 | 47 |
| 1.989 | 4 |
| 1.858 | 44 |
| 1.773 | 6 |
| 1.663 | 13 |

Example 2

In a stainless steel vessel equipped with a stirrer and a gas blowing tube, 803 g of a commercially available sodium aluminate solution (AS-17 manufactured by Hokuriku Kasei Industry Co., Ltd., $Al_2O_3$ concentration of 18.93 mass %, $Na_2O$ concentration of 19.42 mass %) and then 2,997.0 g of water were added, and the mixture together with the vessel was placed in a thermostat maintained at 23° C. and strongly stirred. The solution temperature of the diluted sodium aluminate aqueous solution was 23° C. Gaseous carbon dioxide obtained by gasification of liquid carbon dioxide was introduced in the aqueous solution at a flow rate of 533 mL/min. for 92 minutes. The reaction mixture (slurry) had a solution temperature of 28° C. and pH of 10.75 immediately after the introduction of the gaseous carbon dioxide. In succession, the reaction mixture was stirred at room temperature for 4 hours to obtain 3,800 g of the stirred reaction mixture (pH 10.94, $Al_2O_3$ concentration of 4.0 mass %).

Into a stainless steel autoclave vessel, 3,000 g of the resulting reaction mixture was charged, and subjected to hydrothermal treatment 150° C. for 10 hours. The resulting aqueous suspension had pH of 10.43, an electric conductivity of 55.6 mS/cm and $Al_2O_3$ concentration of 4.02 mass %. When the particle size distribution of this aqueous suspension was measured by a dynamic light scattering method, particles having a hydrodynamic diameter of 185 nm (standard deviation of 21 nm) and particles having a hydrodynamic diameter of 940 nm (standard deviation of 130 nm) were observed.

After the aqueous suspension was taken out, 6,000 g of pure water and 11.0 g of acetic acid were added to the total amount of the aqueous suspension and stirred to adjust pH to 6.25. Thereafter, the resulting mixture was desalted with addition of 7,000 g of pure water by an automatic continuous pressure filtration apparatus equipped with a stirrer and an ultrafiltration membrane (cut-off molecular weight of 50,000), and then concentrated in the apparatus to obtain 1,090 g of an acidic aqueous alumina sol. The obtained acidic aqueous alumina sol had pH of 6.42, $Al_2O_3$ concentration of 11.0 mass %, $Na_2O$ concentration of 101 ppm per mass, an electric conductivity of 125 μS/cm, a viscosity of 30 mPa·s, an acetic acid concentration of 0.20 mass %, a particle size measured by a dynamic light scattering method of 250 nm, and a specific surface area measured by the BET method of powders dried at 300° C. of 110 m²/g.

When the particle size distribution of the obtained acidic aqueous alumina sol was measured by a dynamic light scattering method, only particles having a hydrodynamic diameter of 250 nm (standard deviation of 57 nm) were observed. It was observed through a transmission electron microscope that the primary particles of alumina hydrate contained in the obtained acidic aqueous alumina sol were rectangular plate-like particles having a length of one side of 15 to 30 nm and a thickness of 3.0 to 8.0 nm. And they formed secondary particles of columnar structure or inclined columnar structure having a length of 50 to 350 nm which are formed by face-to-face coagulation of the primary particles.

When powders obtained by drying the acidic aqueous alumina sol at 110° C. was thermally analyzed up to 1,100° C., the colloidal particles of the alumina hydrate had an $H_2O/Al_2O_3$ molar ratio of 1.03 and were identified as an alumina hydrate having a boehmite structure according to the result of powder X-ray diffraction of the above-mentioned powders. This acidic aqueous alumina sol was stable without being gelated even after it was kept airtight at 50° C. for one month.

Example 3

After acetic acid was added to 1,000 g of the acidic aqueous alumina sol obtained in Example 1 to adjust pH to 6.10, the resulting mixture was mechanically dispersed three times at a flow rate of 400 mL/min. using multiple ultrasonic high-pressure impact homogenizers (ultrasonic homogenizer UH-600SREX™ manufactured by SMT Corporation) and then vacuum concentrated to obtain 378 g of a high-concentration acidic aqueous alumina sol.

The obtained acidic aqueous alumina sol had a pH of 6.15, $Al_2O_3$ concentration of 25.1 mass %, an electric conductivity of 320 μS/cm, a viscosity of 1,200 mPa·s, a particle size measured by a dynamic light scattering method of 139 nm, a specific surface area measured by the BET method of powders dried at 110° C. of 115 m²/g, and a specific surface area measured by the BET method of powders dried at 300° C. of 108 m²/g. When the particle size distribution of the obtained acidic aqueous alumina sol was measured by a dynamic light scattering method, both particles having a hydrodynamic diameter of 19.3 nm (standard deviation of 5 nm) and particles having a hydrodynamic diameter of 142 nm (standard deviation of 32 nm) were observed. It was observed through a transmission electron microscope that the primary particles of alumina hydrate contained in the obtained acidic aqueous alumina sol were rectangular plate-like particles having a length of one side of 10 to 20 nm and a thickness of 2.5 to 7.5 nm. And they formed secondary particles of columnar structure or inclined columnar structure having a length of 50 to 300 nm which are formed by face-to-face coagulation of the primary particles.

When powders obtained by drying the acidic aqueous alumina sol at 110° C. was thermally analyzed up to 1,100° C., the colloidal particles of the alumina hydrate had an $H_2O/Al_2O_3$ molar ratio of 1.09 and were identified as an alumina hydrate having a boehmite structure according to the result of powder X-ray diffraction of the above-mentioned powders (Table 1). This acidic aqueous alumina sol was stable without being gelated even after it was kept airtight at 50° C. for one month.

Example 4

A reaction mixture was prepared in the same manner as in Example 1 and 4,200 g of the stirred reaction mixture (pH of 10.79, $Al_2O_3$ concentration of 4.0 mass %) was obtained. Into a stainless steel autoclave vessel, 4,150 g of the resulting reaction mixture was charged, and subjected to hydrothermal treatment 140° C. for 15 hours. The resulting aqueous suspension had pH of 10.45, an electric conductivity of 62.2 mS/cm and $Al_2O_3$ concentration of 4.0 mass %.

After the aqueous suspension was taken out, 4,150 g of water was added to the aqueous suspension, and then 2,739 g of a hydrogen-type cation-exchange resin (Amberlite IR-120B® manufactured by Rohm and Haas Company) was added. Thereafter, 4.2 g of acetic acid aqueous solution having an acetic acid concentration of 20 mass % was further added to adjust pH to 4.69, and then the resulting mixture was vacuum concentrated to obtain 1,126 g of an acidic aqueous alumina sol.

The obtained acidic aqueous alumina sol had pH of 5.34, $Al_2O_3$ concentration of 14.3 mass %, an electric conductivity of 529 μS/cm, a particle size measured by a dynamic light scattering method of 363 nm, a specific surface area measured by the BET method of powders dried at 300° C. of 104 m$^2$/g. It was observed through a transmission electron microscope that the primary particles of alumina hydrate contained in the obtained acidic aqueous alumina sol were rectangular plate-like particles having a length of one side of 10 to 20 nm and a thickness of 2.5 to 7.5 nm. And they formed secondary particles of columnar structure or inclined columnar structure having a length of 50 to 300 nm which are formed by face-to-face coagulation of the primary particles.

Further, this acidic aqueous alumina sol was stable without being gelated even after it was kept airtight at 50° C. for one month.

Example 5

A reaction mixture was prepared in the same manner as in Example 1 and 4,450 g of the stirred reaction mixture (pH of 10.79, $Al_2O_3$ concentration of 4.0 mass %) was obtained. Into a stainless steel autoclave vessel, 4,400 g of the resulting reaction mixture was charged, and subjected to hydrothermal treatment 140° C. for 15 hours. The resulting aqueous suspension had pH of 10.45, an electric conductivity of 62.6 mS/cm and $Al_2O_3$ concentration of 4.0 mass %.

This reaction mixture was desalted while water was added at a constant flow rate and circulated using an automatic continuous pressure filtration apparatus equipped with a stirrer and a microfiltration membrane having a nominal pore size of 0.2 μm. The desalted reaction mixture had pH of 10.26, an electric conductivity of 230 μS/cm and $Al_2O_3$ concentration of 8.0 mass %.

After the desalted reaction mixture was taken out, 6.7 g of acetic acid aqueous solution having an acetic acid concentration of 20 mass % was added to the total amount of the desalted reaction mixture and stirred to adjust pH to 5.50. Thereafter, the resulting mixture was vacuum concentrated to obtain 1,141 g of an acidic aqueous alumina sol.

The obtained acidic aqueous alumina sol had pH of 6.00, an electric conductivity of 700 μS/cm, $Al_2O_3$ concentration of 14.8 mass %, a viscosity of 12.3 mPa·s, a particle size measured by a dynamic light scattering method of 282 nm, and a specific surface area measured by the BET method of powders dried at 300° C. of 106 m$^2$/g.

It was observed through a transmission electron microscope that the primary particles of alumina hydrate contained in the obtained acidic aqueous alumina sol were rectangular plate-like particles having a length of one side of 10 to 20 nm and a thickness of 2.5 to 7.5 nm. And they formed secondary particles of columnar structure or inclined columnar structure having a length of 50 to 300 nm which are formed by face-to-face coagulation of the primary particles.

Further, this acidic aqueous alumina sol was stable without being gelated even after it was kept airtight at 50° C. for one month.

Comparative Example 1

In a stainless steel vessel equipped with a stirrer and a gas blowing tube, 1,258 g of a commercially available sodium aluminate solution (AS-17 manufactured by Hokuriku Kasei Industry Co., Ltd., $Al_2O_3$ concentration of 19.13 mass %, $Na_2O$ concentration of 19.46 mass %) and then 4,758 g of water were added and strongly stirred. The solution temperature of the diluted sodium aluminate aqueous solution was 22° C. Gaseous carbon dioxide obtained by gasification of liquid carbon dioxide was introduced in the aqueous solution at a flow rate of 1.67 L/min. for 53 minutes. The reaction mixture (slurry) had a solution temperature of 26° C. and pH of 11.99 immediately after the introduction of the gaseous carbon dioxide. In succession, the reaction mixture was stirred for 4 hours to obtain 6,000 g of the stirred reaction mixture (pH 13.19, $Al_2O_3$ concentration of 4.0 mass %).

Into a stainless steel autoclave vessel, 4,000 g of the resulting reaction mixture was charged, and subjected to hydrothermal treatment 110° C. for 4 hours. The resulting aqueous suspension had pH of 13.37, an electric conductivity of 35.1 mS/cm and $Al_2O_3$ concentration of 4.0 mass %. When the particle size distribution of this aqueous suspension was measured by a dynamic light scattering method, particles having a hydrodynamic diameter of 201 nm (standard deviation of 26 nm) and particles having a hydrodynamic diameter of 980 nm (standard deviation of 140 nm) were observed.

The powders obtained by drying the aqueous suspension at 110° C. were identified as an alumina hydrate having no a boehmite structure but a gibbsite structure from the result of powder X-ray diffraction.

INDUSTRIAL APPLICABILITY

Compared with a conventional aqueous alumina sol, the stable acidic aqueous alumina sol, and the high-concentration and stable acidic aqueous alumina sol obtained by the present invention act like an intermediate between, for example, a commercially available aqueous alumina sol containing hexagonal plate-like and/or rectangular plate-like particles having high dispersibility of an alumina hydrate having a boehmite structure and a commercially available aqueous alumina sol containing fibrous particles having a high thixotropic property of an alumina hydrate having a boehmite structure, and bring about improvements in various applications which have not been attained by the prior art. Components which are added to a conventional alumina sol to produce a composition may be added to the alumina sol of the present invention. The components include a silica sol, hydrolysate of alkyl silicate, other metal oxide sol, water-soluble resin, resin emulsion, thickener, anti-foaming agent, surfactant, refractory powders, metal powders, pigment, coupling agent and the like.

When the alumina sol of the present invention is blended with various coating components which have been used conventionally, an inorganic coating, heat-resistant coating, corrosion resistant coating, inorganic-organic composite coating or the like can be prepared. A dry coating film formed from a coating containing the alumina sol of the present invention is almost free from pin holes and cracks. The reason for this is considered to be that the 50 to 400 nm columnar secondary particles contained in the alumina sol do not cause a segregation phenomenon in the coating film which is seen in ordinary colloidal particles and a crosslinked structure is formed by the secondary particles in the coating film.

These coatings, adhesives and the like containing the alumina sol of the present invention can be applied to the surfaces of various base materials such as glass, ceramics, metals, plastics, wood, fibers and paper. The alumina sol of the present invention can be impregnated into felt products such as ordinary glass fibers, ceramic fibers and other inorganic fibers.

Since the secondary particles of the alumina sol of the present invention have a columnar shape of 50 to 400 nm, the alumina sol is useful as a surface abrasive for polishing the surface of an interlayer insulating film or a metal wiring of aluminum, copper, tungsten or alloy thereof in a multi-layer wiring semiconductor device and a plating layer such as Ni—P or the like formed on a base material such as a disk for use as a magnetic recording medium.

Although the alumina sol of the present invention exhibits high stability and has the property of changing into a gel in the end by removing its medium, secondary particles contained in the sol have a columnar shape and are as long as 50 to 400 nm. When the sol is gelated or after it is cured, it exhibits special properties derived from the sol. It is easily understood that the alumina sol of the present invention is very useful in various applications other than the above.

What is claimed is:

1. A process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (A), (B) and (C) of:
    (A) adding liquid or gaseous carbon dioxide to an aqueous alkali aluminate solution at a solution temperature of 5 to 35° C. to produce a reaction mixture having a pH of 10.5 to 11.2;
    (B) subjecting the reaction mixture obtained in the step (A) to a hydrothermal treatment at a temperature of 110 to 250° C. to produce an aqueous suspension containing an alumina hydrate having a boehmite structure; and
    (C) desalting the aqueous suspension obtained in the step (B) by adding water and an acid by ultrafiltration to form an acidic aqueous alumina sol having a pH of 3 to 7.

2. The process for producing a stable acidic aqueous alumina sol according to claim 1, wherein in the step (B), the reaction mixture obtained in the step (A) is subjected to a pretreatment by stirring for 2 to 24 hours prior to the hydrothermal treatment.

3. A process for producing a high-concentration and stable acidic aqueous alumina sol, the process comprising mechanically dispersing the stable acidic aqueous alumina sol obtained by the process according to claim 1 and concentrating the sol.

4. The process of claim 1, further comprising forming a dry coating film from the stable acidic aqueous alumina sol.

5. A process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (a), (b) and (c) of:
    (a) adding liquid or gaseous carbon dioxide to an aqueous alkali aluminate solution at a solution temperature of 5 to 35° C. to produce a reaction mixture having a pH of 10.5 to 11.2;
    (b) subjecting the reaction mixture obtained in the step (a) to a hydrothermal treatment at a temperature of 110 to 250° C. to produce an aqueous suspension containing an alumina hydrate having a boehmite structure; and
    (c) desalting the aqueous suspension obtained in the step (b) by adding water and an acid by cake filtration to form an acidic aqueous alumina sol having a pH of 3 to 7.

6. The process for producing a stable acidic aqueous alumina sol according to claim 5, wherein in the step (b), the reaction mixture obtained in the step (a) is subjected to a pretreatment by stirring for 2 to 24 hours prior to the hydrothermal treatment.

7. A process for producing a high-concentration and stable acidic aqueous alumina sol, the process comprising mechanically dispersing the stable acidic aqueous alumina sol obtained by the process according to claim 5 and concentrating the sol.

8. A process for producing a stable acidic aqueous alumina sol containing columnar secondary particles having a length of 50 to 400 nm which are formed by face-to-face coagulation of rectangular plate-like primary particles having a length of one side of 10 to 40 nm and a thickness of 2.5 to 10 nm when observed through an electron microscope, the process comprising the steps (A'), (B') and (C') of:
    (A') adding liquid or gaseous carbon dioxide to an aqueous alkali aluminate solution at a solution temperature of 5 to 35° C. to produce a reaction mixture having a pH of 10.5 to 11.2;
    (B') subjecting the reaction mixture obtained in the step (A') to a hydrothermal treatment at a temperature of 110 to 250° C. to produce an aqueous suspension containing an alumina hydrate having a boehmite structure; and
    (C') contacting the aqueous suspension obtained in the step (B') with hydrogen-type acidic cation-exchange resin and hydroxide-type strongly basic anion-exchange resin to form an acidic aqueous alumina sol having a pH of 3 to 7.

9. The process for producing a stable acidic aqueous alumina sol according to claim 8, wherein in the step (B'), the reaction mixture obtained in the step (A') is subjected to a pretreatment by stirring for 2 to 24 hours prior to the hydrothermal treatment.

10. A process for producing a high-concentration and stable acidic aqueous alumina sol, the process comprising mechanically dispersing the stable acidic aqueous alumina sol obtained by the process according to claim 8 and concentrating the sol.

11. A process for producing an aqueous suspension containing an alumina hydrate having a columnar structure or inclined columnar structure and a boehmite structure formed by face-to-face coagulation of rectangular plate-like primary particles having a length of one side of 10 to 40 nm and a thickness of 2.5 to 10 nm when observed through a transmission electron microscope, the process comprising the steps (A) and (B) of:
  (A) adding liquid or gaseous carbon dioxide to an aqueous alkali aluminate solution at a solution temperature of 5 to 35° C. to produce a reaction mixture having a pH of 10.5 to 11.2; and
  (B) subjecting the reaction mixture obtained in the step (A) to a hydrothermal treatment at a temperature of 110 to 250° C. to produce an aqueous suspension containing an alumina hydrate having a boehmite structure.

* * * * *